US009358921B2

(12) United States Patent
Gary

(10) Patent No.: US 9,358,921 B2
(45) Date of Patent: Jun. 7, 2016

(54) LED SIGNAL LAMP

(71) Applicant: Virginia Electronic & Lighting, L.L.C., Green Cove Springs, FL (US)

(72) Inventor: Forrest Owen Gary, Indian Harbour Beach, FL (US)

(73) Assignee: Virginia Electronic & Lighting, LLC, Green Cove Springs, FL (US)

( * ) Notice: Subject to any disclaimer, the term of this patent is extended or adjusted under 35 U.S.C. 154(b) by 0 days.

(21) Appl. No.: 14/543,203

(22) Filed: Nov. 17, 2014

(65) Prior Publication Data
US 2015/0137679 A1 May 21, 2015

Related U.S. Application Data

(60) Provisional application No. 61/904,653, filed on Nov. 15, 2013.

(51) Int. Cl.
H05B 33/08 (2006.01)
B60Q 3/00 (2006.01)
B61L 5/18 (2006.01)

(52) U.S. Cl.
CPC .............. *B60Q 3/00* (2013.01); *B61L 5/1854* (2013.01); *B61L 5/1881* (2013.01); *H05B 33/0893* (2013.01); *B61L 2207/02* (2013.01)

(58) Field of Classification Search
CPC ........... H05B 33/0815; H05B 33/0818; H05B 37/029; H05B 37/02; H05B 41/3925; H05B 41/391; H05B 41/2828; H05B 33/0803; B60Q 1/32; B60Q 1/2696

USPC ............ 315/294, 307, 154, 186; 340/12, 641, 340/642
See application file for complete search history.

(56) References Cited

U.S. PATENT DOCUMENTS

| 5,262,609 | A  | * | 11/1993 | Nowak et al. ................. 219/109 |
| 5,457,450 | A  | * | 10/1995 | Deese et al. .................. 340/912 |
| 6,597,179 | B2 |   | 7/2003  | St-Germain |
| 6,600,324 | B2 |   | 7/2003  | St-Germain |
| 6,608,485 | B2 |   | 8/2003  | St-Germain |
| 6,624,638 | B2 |   | 9/2003  | St-Germain |
| 6,642,666 | B1 |   | 11/2003 | St-Germain |
| 6,762,563 | B2 |   | 7/2004  | St-Germain et al. |
| 7,425,798 | B2 |   | 9/2008  | St.-Germain |
| 8,519,566 | B2 |   | 8/2013  | Recker et al. |
| 2002/0001463 | A1 | * | 1/2002 | Inoue et al. ..................... 396/28 |
| 2003/0085710 | A1 |   | 5/2003 | Bourgault et al. |
| 2004/0022057 | A1 | * | 2/2004 | Lee ............................... 362/238 |

(Continued)

OTHER PUBLICATIONS

PCT International Searching Authority; International Search Report and written opinion dated Apr. 8, 2105; entire document.

*Primary Examiner* — Douglas W Owens
*Assistant Examiner* — Syed M Kaiser
(74) *Attorney, Agent, or Firm* — Allen Dyer Doppelt Milbrath & Gilchrist

(57) ABSTRACT

A light emitting diode (LED) signal lamp includes a lamp housing having at least one light opening, a power connection mounted on the lamp housing for connection to a power cable, a plurality of LEDs mounted within the lamp housing to shine through the at least one light opening when powered, and a control circuit for supplying electrical power to the plurality of LEDs via the power connection. The control circuit is configured to permit the LED signal lamp to safely, reliably and effectively interact with wayside control systems designed for incandescent signal lamps.

29 Claims, 4 Drawing Sheets

(56) References Cited

U.S. PATENT DOCUMENTS

| | | | |
|---|---|---|---|
| 2005/0195545 A1* | 9/2005 | Mladenik et al. | 361/93.1 |
| 2005/0259434 A1* | 11/2005 | Pederson | 362/555 |
| 2009/0135732 A1* | 5/2009 | Maxson | 370/252 |
| 2012/0154176 A1 | 6/2012 | Nguyen et al. | |
| 2012/0256998 A1* | 10/2012 | Inoue | 347/247 |
| 2012/0262093 A1 | 10/2012 | Recker et al. | |
| 2014/0062297 A1* | 3/2014 | Bora et al. | 315/34 |
| 2014/0159614 A1* | 6/2014 | Hussain et al. | 315/307 |

* cited by examiner

LED SIGNAL LAMP

CROSS-REFERENCE TO RELATED APPLICATION

This application claims the benefit of U.S. Provisional Application Ser. No. 61/904,653, filed on Nov. 15, 2013, the contents of which are herein incorporated by reference in their entirety.

FIELD OF THE INVENTION

The present invention relates to light emitting diode (LED) signal lamps, and more particularly, to LED signal lamps operating as wayside signal lights for railroad transportation.

BACKGROUND OF THE INVENTION

Signal lamps, such as railroad wayside signal lights, are critical pieces of safety equipment. Multiple fatal accidents have occurred over the years as a result of signal lamp failure. The history of signal lights in the railroad industry is particularly illustrative of the challenges associated with developing and implementing technological changes to improve safety and reliability.

Looking at the United States, for example, the national railroad network was already quite extensive by the time widespread electrification became practical. Replacing mechanical signals with incandescent signal lamps was by no means uniform across the network, and despite electrification, signal operation was still quite manpower intensive. It was well after the initial introduction of electric signal lamps that automated wayside control systems came into widespread use.

Naturally, these control and monitoring systems were designed to work with the vast numbers of incandescent lamps that were in existence at the time. In addition to controlling the signal lights to display appropriate signals for current railroad conditions, another critical function of such systems was to proactively detect incandescent bulb failure. In addition to signaling the need for maintenance, detection of bulb failure would lead to changes in lamp control to safely accommodate a failed bulb.

Tests for proper operation executed by wayside control systems included: a cold filament test, a hot filament test, an inrush current test and a lamp off test. The cold filament test was performed when the incandescent lamp was off. A short current pulse (milliseconds) was applied by the control system to the lamp. An intact filament would mirror a short circuit to ground, and indicators of a passed test include pulse voltage below a specified voltage limit and pulse current above a specified current limit. The hot filament test applied when the lamp was on by monitoring operating current, with current falling below a specified limit indicating a failure. The inrush current test applied during the period immediately following energizing the incandescent lamp, when due to lower filament resistance, current levels can be much higher than the normal operating current. This inrush current effect is mitigated if the incandescent light is flashed since the filament does not cool immediately after turning off. The lamp off test applied while the incandescent bulb was on to verify that it could be turned off, with the control system looking for voltage across the bulb to go to zero. The off period was sufficiently short that the voltage was reapplied before the filament dimmed appreciably.

Light emitting diodes (LEDs) have very different operating characteristics than incandescent lamps. Perhaps most notably, an LED does not use a filament to generate light, and its current and voltage response characteristics when energized, operated and de-energized are very different from incandescent bulbs. Additionally, for adequate visibility an array of many LEDs must ordinarily be used to replace a single color incandescent bulb in a signal lamp. A failure of a limited number of LEDs within such an array may still fall within acceptable parameters.

Again due to the large number of existing wayside control systems in existence, it is considered desirable to continue using these extant wayside control systems when replacing incandescent bulbs in signal lamps with LED lamps. Accordingly, the LED lamp needs to assess its own functionality according to parameters suitable for LED lamps, while mimicking the corresponding response to tests designed for incandescent bulbs based on that assessment.

Complicating the matter further, multiple manufacturers produced wayside control systems with some significant variations in how one or more of the previously described tests were implemented. Some control systems make use of signal lamps having dual filaments, where a second filament is powered off a second power line after the first filament fails, allowing a period of continued operation after lamp failure is indicated to the control system by the failure of the first filament. Consequently, LED replacement lamps have needed to be specific to a particular wayside control system with which they were designed to work. Also, while most of these wayside control systems utilize programmable, processor-controlled units, there still exist older devices which utilize large mechanical relays. Additionally, most wayside control systems are provided with battery back-up, and some power the signal lamps via battery power for extensive periods of time, resulting in further complications for LED signal lamps.

Thus, while LED lamps exist for replacing incandescent lamps in some of these situations, further improvements are possible.

SUMMARY OF THE INVENTION

In view of the foregoing, it is an object of the present invention to provide an improved light emitting diode (LED) signal lamp, and in particular, an LED signal lamp for wayside signal lamps in railroad applications. According to an embodiment of the present invention, an LED signal lamp includes a lamp housing having at least one light opening, a first power connection mounted on the lamp housing for connection to a first power cable, a first plurality of LEDs mounted within the lamp housing to shine through the at least one light opening when powered, and a first control circuit for supplying electrical power to the first plurality of LEDs via the first power connection.

According to an aspect of the present invention, the first control circuit is configured to automatically measure a first cable resistance of the first power cable and control the supply of electrical power to the first plurality of LEDs based thereon.

According to another aspect of the present invention, the first control circuit including first and second processors and a first memory connection. The first and second processors are configured to independently monitor first lamp failure criteria and independently open the first memory connection upon determining satisfaction of the first lamp failure criteria, opening of the first memory connection being effective to indicate failure of first lamp operational tests transmitted via the first power cable.

According to a further aspect of the present invention, the first power connection allows connection to primary and secondary power lines, and opening of the first memory connection is effective to indicate failure of first lamp operational tests transmitted via the primary power line, the first control circuit powering the first plurality of LEDs from the first power line prior to opening the first memory connection and from the second power line subsequent to opening the first memory connection.

These and other objects, aspects and advantages of the present invention will be better appreciated in view of the following detailed description.

DETAILED DESCRIPTION OF PREFERRED EMBODIMENTS

A light emitting diode (LED) signal lamp 10, according to an embodiment of the present invention, is described below in the context of an LED signal lamp configured to work with railroad wayside control systems, in which context the present invention is believed to be particularly advantageous. However, it will be appreciated that features of the present invention are not necessarily limited to such applications, but could be employed in LED signal lamps used in other applications.

Figure 1:
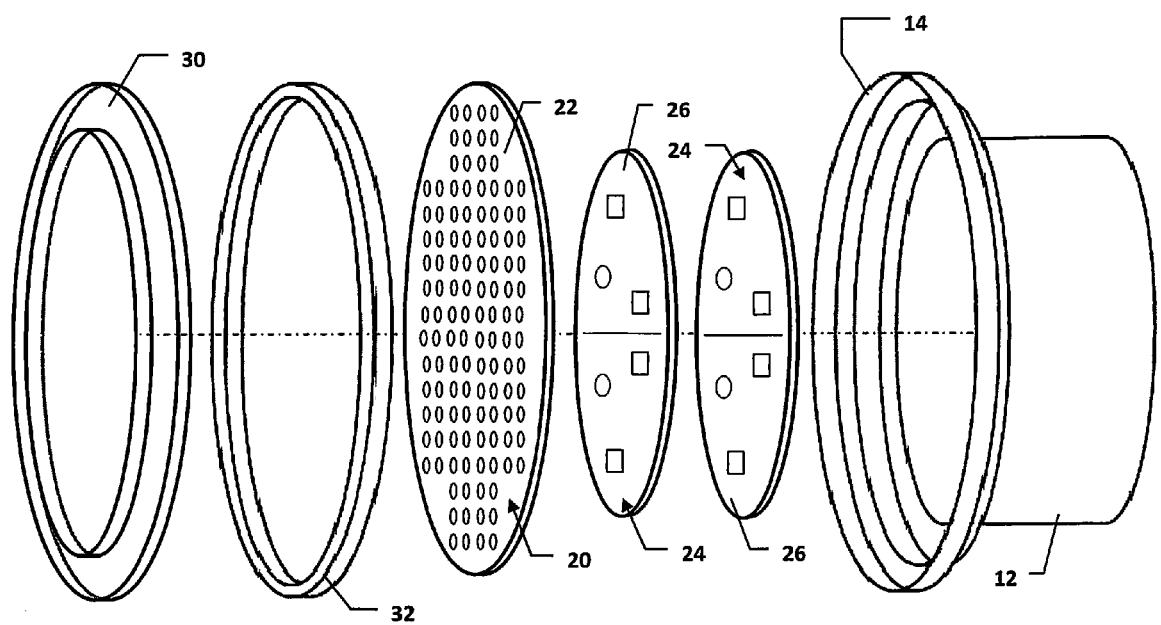
FIG. 1 is an exploded perspective view of a light emitting diode (LED) signal lamp, according to an embodiment of the present invention.
Figure 2:
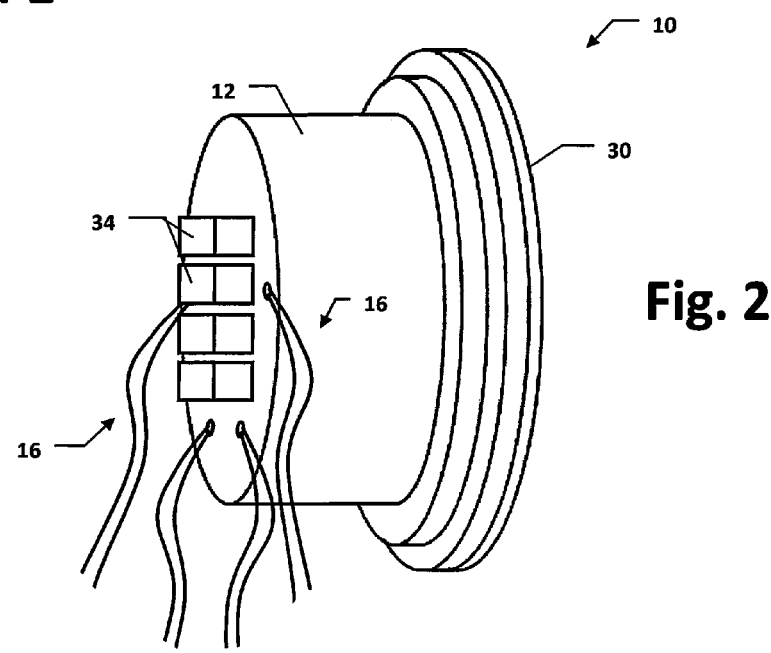
FIG. 2 is another perspective view of the LED signal lamp of FIG. 1.

Referring to FIGS. 1 and 2, the LED signal lamp 10 includes a housing 12 defining a light opening 14. Power connections 16 are mounted on the housing 12 for connection to power cables from a wayside control system. A plurality of LEDs 20 are mounted on a circuit board 22 within the housing 12 and oriented so as to shine through the light opening 14. Control circuits 24 are formed on circuit boards 26 and control the supply of electrical power from the power connections 16 to the LEDs 20.

The housing 12 is preferably made of plastic, metal or other suitably durable and weather-resistant material. A lens 30 covers the light opening 14, with a seal 32 or the like helping to maintain a watertight boundary thereground. Load resistors 34, whose purpose will be explained in greater detail below, are mounted exteriorly to the housing 12.

The depicted lamp 10 is a four color lamp, with the LEDs 20 including first, second, third and fourth pluralities of different colors mounted on the circuit board 22 but connected to separate electrical circuits. Each color has a respective, independent power connection 16 and control circuit 24 (and load resistor 34), with the power connections 16 color-coded to their respective LED color for ease of proper installation. For a signal lamp replacing single filament incandescent bulbs, there will typically be two wires for each power connection 16; a positive lead and ground. For double filament bulbs, there will typically be three wires; primary and secondary leads and a common ground.

Figure 3:
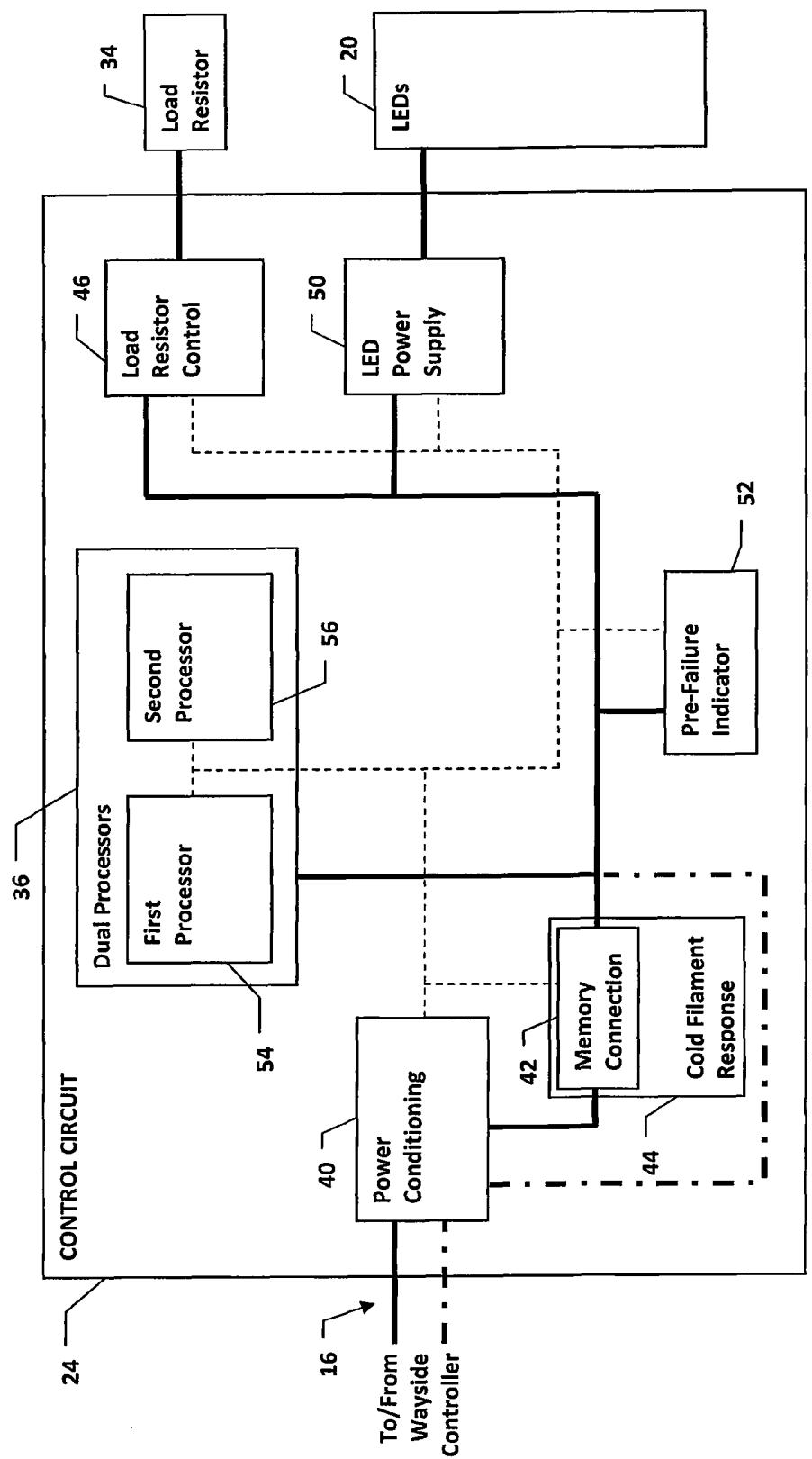
FIG. 3 is a schematic overview of a control circuit for the LED signal lamp of FIG. 1.

Referring to FIG. 3, each independent control circuit 24 is substantially identical and advantageously includes a processor complex 36, power conditioning circuitry 40, a memory connection 42, a cold filament response circuit 44, a load resistor control circuit 46, and a LED power supply 50. Advantageously, the control circuit 24 can also include a pre-failure indicator 52.

The processor complex 36 preferably includes independent first and second processors 54, 56. The processor complex 36 monitors and controls operation of the other control circuit 24 components. Notably, either processor 54, 56 is independently capable of operating the memory connection 42, and the second processor 56 will continue to operate at a lower input voltage than the primary processor 54, for reasons that will be explained in greater detail below. The processors 54, 56 will open the memory connection 42 based on the satisfaction of lamp failure criteria, advantageously including failure of either processor 54, 56, failure of the data connection between the processors, and an LED failure determination. Preferably, the particular failure criteria that resulted in opening of the memory connection 42 is stored in non-volatile memory, from whence it can later be extracted for diagnostic purposes.

The LED failure determination is preferably based upon failure of a predetermined number of the LEDs 20, as determined by a sensed current draw of the LEDs 20 falling below a predetermined current threshold stored in non-volatile memory. Advantageously, the current threshold is based on an actual measured current draw of the LEDs 20 when newly-installed. To avoid premature failure, the processors 54, 56 execute a counter that records occurrences of sensed current dropping below the threshold, and the LED failure determination is only made after the failure counter reaches a predetermined counter threshold; for example, a cumulative time that the current draw of the LEDs 20 has been sensed falling below the predetermined current threshold. This method of LED failure determination helps mitigate the effect of noise on current sensing as the predetermined current threshold is approached.

The power conditioning circuitry 40 advantageously includes rectification such that the wires of each power connection 16 can be connected to either wire of the power cable from the wayside controller without adversely impacting operation. Where the wayside control system supports dual filament operation, an additional power line (long/short broken lines) is also included in the rectification arrangement. The power conditioning circuitry 40 also allows for discharging of cable capacitance. Where the signal lamp 10 receives power from a controller relay, the power conditioning circuitry 40 further aids in addressing power supply issues associated with such relays, as described further below.

The memory connection 42 is an electromechanical connection that, when opened, presents the open circuit that would be seen by the wayside control system in response to a cold filament test as the result of an incandescent lamp failure. Preferably, the memory connection 42 "remembers" its state without the application of power, so that it will remain closed until the processor complex 36 causes the connection 42 to be opened. Once open, the connection 42 will remain open, causing all further lamp tests to be failed and ensuring the signal lamp 10 defaults to an inherently safe condition. While either processor 54, 56 of the complex 36 is able to open the memory connection, it is further preferred that the control circuit 24 not be configured to reclose the memory connection.

Figure 4:
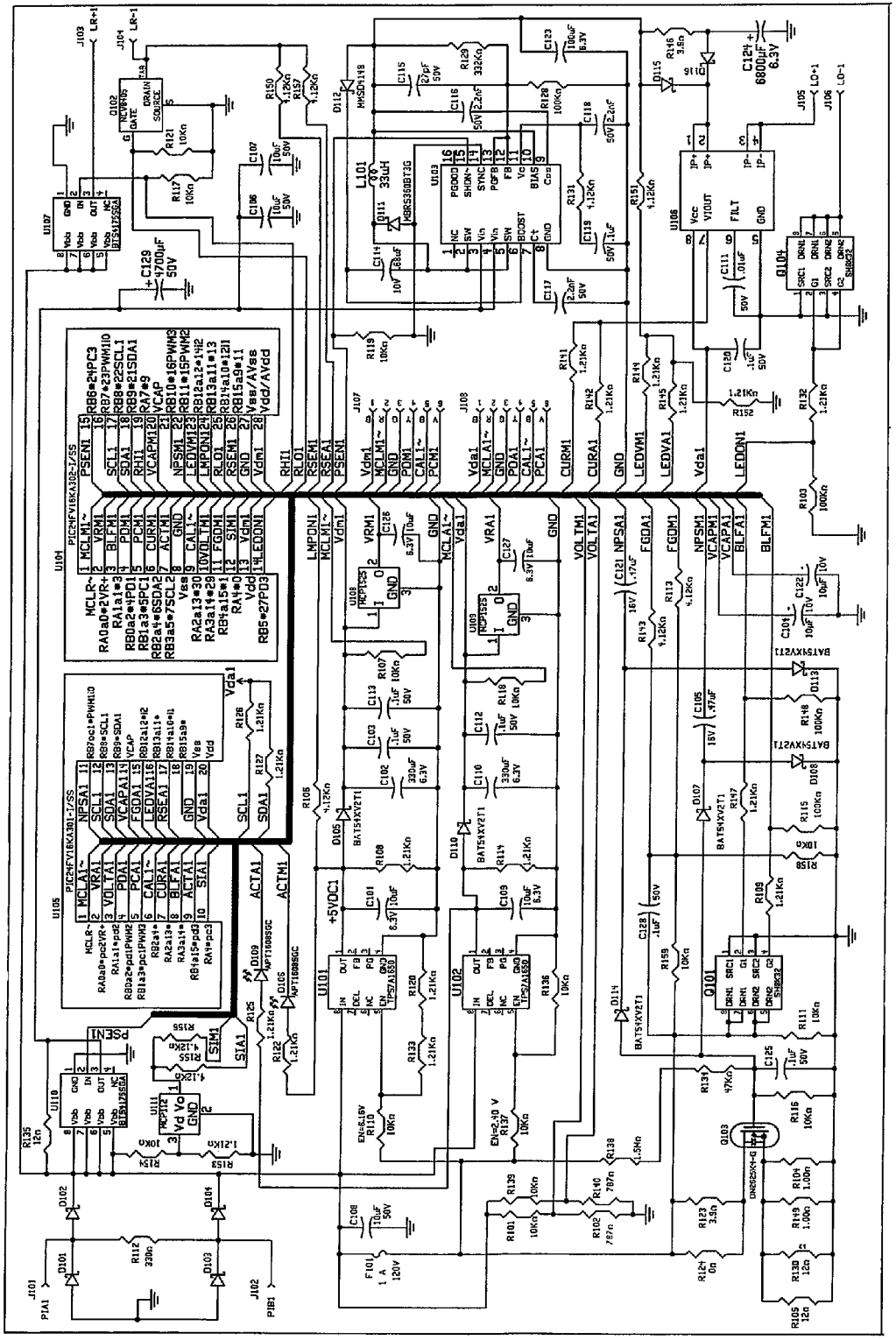
FIG. 4 is a detailed schematic of one embodiment of the control circuit of FIG. 3.
Figure 5:
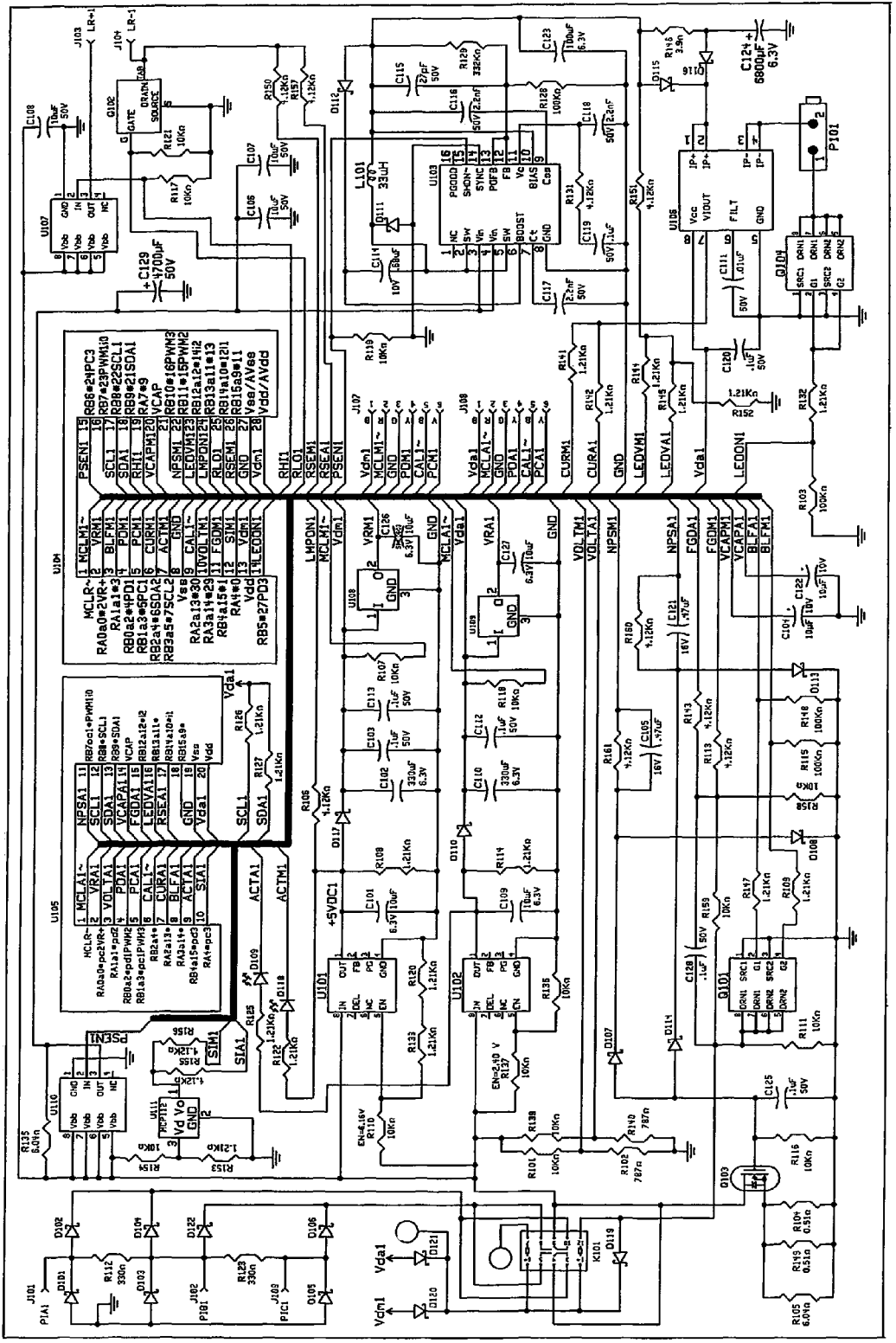
FIG. 5 is a detailed schematic of an alternate embodiment of the control circuit of FIG. 3.

Advantageous examples of the memory connection 42 include a fuse, which is blown to open the memory connection 42 and result in test failure, and a latching relay that is repositioned to open the memory connection 42. FIGS. 4 and 5 are exemplary electrical schematics of the control circuit 24, components of which will be referenced in following in-depth description of circuit functions. In FIG. 4, a fuse F101 serves as the memory connection 42. In FIG. 5, a latching relay K101 serves as the memory connection. Many control circuit 24 components are identical regardless of which memory connection type is used, and are presented in both Figures with the same reference numbers. Components specific to a particular Figure are given a unique identifier.

Although a latching relay could be employed in signal lamps for single or dual filament circuits, such a relay is particularly advantageous in dual filament circuits, as the repositioning the relay can be used not only to present an open circuit of the first power line (and indicate failure of all subsequent tests on that line), but also to connect the second power line to permit continued lamp 10 operation powered therefrom. For further illustration of this, FIG. 5 also depicts the control circuit 24 with connections for the second power line.

Schematically, in FIG. 3, power to other control circuit 24 components (e.g., load resistor control 46 and LED power supply 50) is shown passing through the memory connection 42. This is operationally accurate; except in the case where there is a second power line (i.e., in a dual filament circuit), power will not be supplied to the load resistor 34, LEDs 20 or other circuit components after the memory connection 42 is opened. However, this does not necessarily mean that electrical power for all these components is physically routed through the memory connection 42 when it is closed. Circuit components can be connected to incoming power in parallel with the memory connector, but (in a single filament circuit) will not be switched on—and hence not receive power—when the memory connection 42 is open.

As described above, wayside control systems perform four different tests on the signal lamps: cold filament, hot filament, inrush current and lamp off tests. The four tests are very complex for an LED light source which replaces an incandescent bulb. While all four of the tests must be passed or failed as appropriate, the cold filament test is the most challenging for an LED circuit as an electronic pulse is periodically sent to the lamp from the wayside control unit and the LED unit must not flash as to be visible to the naked eye. When the signal lamp 10 is not powered on (and the memory connection 42 has not been opened due to lamp failure), the cold filament response circuit 44 is switched on and presents a low resistance path to ground for the cola filament test pulses. If the memory connection 42 is open, then all lamp tests, including cold filament tests, will see an open circuit and fail.

Since the LEDs 20 do not draw as much current as an incandescent bulb, the load resistor 34 is needed to pass the hot filament test. The load resistor control circuit 46 places the load resistor 34 in the electrical circuit when the signal lamp 10 is turned on. As will be explained in greater detail below, the timing of the switching on of the load resistor 34 and load capacitors in the control circuit 24 ensure a proper response to the inrush current test. Additionally, the load resistor control circuit 46 is able to connect the load resistor 34 to incoming power as known resistance to permit determination of a cable resistance of the power cable from the wayside control system.

The LED power supply 50 includes a switching power supply which supplies a regular input voltage to the LEDs 20. The LED power supply 50 incorporates sense connections for sensing current draw of the LEDs 20, allowing the processor complex 36 to determine when a sufficient number of LEDs 20 have failed to be considered a lamp failure, and open the memory connection 42 accordingly. A capacitor connected across the LED power supply 50 stores sufficient power to ensure no LED flashing during a lamp off test.

Since the control circuit 24 is continuously monitoring LED 20 operation, it can usefully predict when lamp failure is imminent. A pre-failure indicator 52 can be triggered when an imminent failure threshold is reached (prior to the actual LED failure determination). The pre-failure indicator 52 can include a special lamp, a horn, or other means of effectively communicating the imminent need for lamp 10 replacement. In dual filament systems, this can also be achieved by adjusting the current threshold for LED failure determination to a point indicating fewer LED failures, such that switching to the second power line provides a failure indication and time to change the lamp 10. The pre-failure indicator 52 can also be applied in this scenario as an additional indicator.

For illustrative and informative purposes, a more detailed description of the accomplishment of circuit functions will be made with reference to FIGS. 4 and 5. For multi-colored lamps, each color is on a separate circuit and, therefore, not common to one another. Except for primary and second power lines into a dual filament lamp (where these is a common ground within a given color), there are no common grounds or signal traces. There are no safety issues with turning on two or more colors simultaneously, or mixing up colors by using a lead from one color and the lead from another color. Due to diode bridge circuitry and no common ground or signal circuitry there are no plus or minus wires (polarity requires more attention with dual filament lamps). Therefore, in order to simplify and mistake proof wiring the lamp by the installation crew, the two power input wires for each color match the LED signal color and either may be connected to signal or ground (in single filament connections).

Power enters the control circuit 24 of the signal lamp 10 through a bridge rectifier. The bridge rectifier is used to make the lamp insensitive to the polarity of the power input. There is a 300 Ohm resistor across power to discharge cable capacitance. When the LED lamp is operating, the current draw of the LEDs is monitored. As LEDs in the array fail, the current draw will drop. Once the current draw drops below a predetermined threshold (or other, current-draw independent inoperability criteria are met), the fuse (FIG. 4) or latching relay (FIG. 5) will be opened, effecting failure of all subsequent tests, as will be explained in greater detail to follow.

The internal power supply is a linear 5 VDC regulator that is enabled through the memory connection, described below. When lamp power is on and exceeds 6 VDC, the internal power is enabled and supplies power to the processor.

Cold Filament Test.

The LED power supply includes U103 and associated circuitry. U103 is a 200 kHz monolithic buck switching regulator that accepts input voltages up to 60V. The normally closed semiconductor switch provides a passing cold filament response through the memory connection. When lamp power is applied, the processor starts in a few milliseconds and turns off the cold filament switch (preferably when LEDs are powered on, which can be several milliseconds after initial power on). When the processor determines that cold filament tests should fail, the memory connection is opened and all subsequent cold filament tests fail.

Looking particularly at FIG. 5, the first filament power bridge and the second filament ¾ bridge are shown with their cable capacitance drain resistors. Also shown are the latching relay, K101, and the cold filament response transistor, Q103, with its associated circuitry. The contacts of K101 are shown in their normally closed position. When primary power is turned on at J101 and J102, a positive voltage is present on K101 pins 3 and 10. This voltage is conducted to K101 pins 4 and 9 to the drain of the cold filament response transistor, Q103, which is an enhancement mode FET. With the resistors in its source circuit, R104 and R149, Q103 forms a 1.5 Amp constant current source. This constant current source remains active until one, or both, processors activate the negative bias sources and turn off Q103. The 1.5 Amp current represents a passing response to a cold filament test. When one, or both, processors determine that the lamp is in a light out condition, the relay set transistor Q101 is activated and the latching relay contacts move to the set position, and contacts 4 and 9 are connected to contacts 5 and 8. When the latching relay is "open", primary power is no longer available to any part of the circuit and primary (i.e., first filament) cold filament tests are failed. If it is connected, secondary (i.e., second filament) power is available to the cold filament circuit and other circuits in the lamp through contacts 5 and 8.

Hot Filament Test.

The control circuit monitors the LED circuit current draw and expects it to be above a specified level which indicates that sufficient light is emitted. As LED failures accumulate in the LED lamp circuit and a specified percentage of LEDs fail corresponding to a specified reduced brightness, the current draw will drop below a predetermined programmed limit and the hot filament test will fail—as will subsequent cold filament tests. Because the LED lamp draws much less current than the incandescent bulb which it replaces, a load resistor must be used to allow the hot filament test to be passed.

The load resistor is connected across J103 and J104. The high side switch, U107, is controlled by the main processor RHI1 signal. The low side switch, Q102, is controlled by the main processor RLO1 signal. Sense signals for both processors are provided through R150 and R157. Using these sense lines, the processors can monitor the current flow through the load resistor. The on resistance of Q102 provides the sense resistor for the current measurement.

The performance of LEDs varies by color and by manufacturing lot. In particular, the current consumed by LEDs while operating properly can vary. Accumulated over an entire array of LEDs, such differences can become significant—to the point where, if nominal performance values were assumed to be correct, the light out circuit might make an inaccurate lamp failure determination. Failing the lamp too early (i.e., while more than the required number of LEDs remain operational) results in unnecessary operational limitations and maintenance. Failing the lamp too late (i.e., with less than the required number of LEDs operational) is a potential safety issue. To maintain accurate determination of lamp failure conditions, each lamp is advantageously tested to determine actual operating current for the LED array, and the failure threshold is calibrated based thereon, with the necessary operating parameters stored in non-volatile memory in the lamp circuitry.

To provide for internal failure mitigation (i.e., failures in the control circuit, itself, which should separately trigger opening of the memory connection) at power on and at the end of each 2 millisecond test power drop out, the inputs to U107 and Q102 are cycled by the main processor to test the proper operation of both devices and the load resistor.

Inrush Current Test.

As shown, there are filter capacitors on incoming power. These capacitors are required on the input to the switching power supply and may also be required to deal with vital relay impedance. Capacitors on the power input can cause a current surge at turn on that appears to be short circuit to some controllers. The surge current limit circuit is comprised of U110 and R135. At turn on, U110 is off and the charge current for C106, C107, and C129 (if it is present) flows through R135. The resistance of R135 is similar to the resistance of a cold incandescent filament, so it will not be interpreted as a short circuit. After the capacitors have had sufficient time to charge (several milliseconds) U110 is turned on by the PSEN signal from the processor and R135 is bypassed. The high frequency current pulses caused by the switching power supply are smoothed by C106 and C107. The inrush current is controlled in both flash and constant on modes for each LED color.

Lamp Off Test. While the LED lamp circuit is on, the wayside control system periodically turns it off for a short time (~2 ms) to verify that it can be turned off. This test simply looks for the voltage across the LED lamp circuit to go to zero. An LED energy storage capacitor, C124, with diodes, D115 and D116, keeps the LED lighted during this period. A resistor has been added at the power input of the LED color to provide a discharge path for any stray capacitance on the power cable. The resistor does add some power to the lamp power load at nominal supply voltage.

Operation with Wayside Relays.

The wayside signal lamp is able to operate with a wayside relay unit as well as a programmable wayside controller. When a relay or other impedance is placed in series with the lamp, there are three effects: voltage drop, added reactance, and hysteresis. The control circuit is configured to deal with these effects and the changes required to mitigate them.

Voltage drop results from the resistance of the added series element and it reduces the amount of voltage available to the lamp. Since the lamp is required by specification to work at a minimum of 8.5 V. The system power supply must supply additional voltage to overcome the series drop of the added element.

With respect to reactance, a relay (among other possible wayside control system components) adds inductance to the circuit. Series inductance acts as a low pass filter, so it resists rapid changes in current through the circuit. Since the lamp drive circuit is a switching power supply, the invention adds capacitance at the input to the power supply to offset the low pass filter of the relay. Capacitance in series with the relay inductance can, however, create a resonant tank circuit and lead to unwanted results. The needed capacitance is added inside the bridge rectifier and inside a switched charge current limiting circuit. This prevents the creation of the resonant tank circuit and it prevents the capacitance from showing false positive results to cold filament pulses should they occur.

Regarding hysteresis, when the lamp is on, it draws 1+ amp from the power supply and through any series impedance. This causes a drop in the voltage available to the lamp. At low power supply voltages, this drop could reduce the available voltage below the operating voltage of the lamp causing it to turn off. When the lamp turns off, the voltage rises again and the lamp turns on again. This behavior is not allowed by specification. The lamp can function properly at an input voltage below 8.5 V. It takes advantage of this fact to create a hysteresis guard band to prevent the flash behavior described above. The processors in the lamp keep the lamp on until the input voltage is about 7.5 V then turns it off below 7.5 V. The lamp is kept off until the input voltage rises above 8.5 V. This provides about 1 V of hysteresis. Adding 0.1 Ohm of cable resistance to 0.2 Ohm of relay coil resistance and using 1.5 A of current draw for the lamp results in a voltage change at the lamp input of 0.3*1.5=0.45 V. The 1 V of hysteresis is adequate to mitigate this amount of input change.

The relay filter capacitor C129 is only used on lamps that will be powered through a relay coil. The relay coil adds 0.2 Ohms resistance and a noticeable amount of inductance to the power input to the lamp. The capacitor is needed to filter the interaction between the switching power supply and the relay coil inductance. All of the switching power supply filter capacitance must be isolated from input power because it can produce a false positive cold filament response when the lamp is in lamp out condition. The needed isolation is provided by the capacitor surge current limiting circuit made up of U110 and R135. When lamp power first comes on, U110, a solid state switch, is open and the capacitor surge current must flow through R135. The surge current is limited to a level that will not pass the cold filament test.

Another voltage drop issue can occur when LED signal lamps are operated off of battery power supplies, which are more prone to voltage drops in the face of significant electrical load. Compounding this problem are physical setups where longer power cable runs are utilized between the wayside control system and relatively distant signal lamps. Unlike an incandescent bulb, a switching power supply of the present LED signal lamp draws more current as its input voltage is lowered. This is because the switching power supply has a regulated output voltage and, in a switching power supply, power in equals power out. As the input voltage goes down the input current must go up. Thus, when the supply voltage is low, more current is drawn and the IR (current times resistance) drop in voltage over long power cables is greater. This higher IR drop can lead to lamp flashing and such flashing is absolutely against operating requirements. The flashing occurs when the voltage at the lamp end of the power cable is slightly above the minimum operating level for the lamp when off. When the lamp turns on, the cable IR drop helps the voltage to drop below the minimum operating level for the lamp. As a result, the lamp turns off, the IR drop goes to zero, and the cycle repeats, effectively causing lamp flashing.

To eliminate this problem, the LED signal lamp of the present invention, proactively determines the turn on voltage drop by measuring power cable resistance. If reducing the required lamp power draw can allow operation without flashing, the control circuit is configured to adjust power supply to the LEDs accordingly.

Adjustment of power supply is preferably accomplished by dimming. Dimming is performed by pulse width modulating the enable signal to the low side LED switch, increasing the LED off cycle during operation. There are several levels of dimming available with the most dimmed level causing the lamp to draw about one Amp at the lowest operating voltage. To measure the cable resistance, the load resistor is turned on as a single load causing a known amount of current to be drawn through the cable resistance. The resulting voltage drop is determined and used to calculate base dimming threshold voltage (e.g., based on the lamp drawing one Amp when powered).

An exemplary lamp operating voltage is specified to be 8.5 VDC to 16 VDC. In cases where the lamp is being powered by a battery, the lamp will require 8.5 VDC (a base turn on threshold) plus the calculated IR drop to turn on (collectively, a turn on threshold voltage) and then will operate with dimming until the voltage falls below 7 VDC (a low voltage threshold).

As mentioned above, the light out circuit not only monitors LED lamp operation and ensures proper responses to the wayside control system tests are made, but for greater reliability and safety, also monitors its own operation to ensure that circuit conditions that would unacceptably diminish the likelihood of proper operation will result in lamp failure indications. The dual processor helps provide this self-monitoring and enhanced reliability.

The main processor, U104, controls the operation of the lamp. The low voltage, or auxiliary, processor U105 monitors the operation of both the main processor and the lamp. The low voltage processor continues operation as input voltage is reduced to below 2 VDC. The low voltage processor prevents potential damage to the cold filament response circuit during low voltage operation. Below 2 VDC, the cold filament response circuit will not be damaged. The two processors communicate over a serial connection. If either processor detects a failure of the serial connection, the memory connection, will be opened and the lamp will enter the lamp out condition. The processors are powered by separate regulator and energy storage circuits. Capacitors C102 and C110 store enough energy to keep their respective processors operating for several milliseconds after power is removed from the lamp. This allows time to operate through periodic test power removals and for an orderly shutdown of the lamp. Separate A/D reference voltage generators, U108 and U109, provide for accurate ND measurements. Connectors J107 and J108 support in circuit programming of the processors and lamp calibration.

Each of the processors is capable of opening the memory connection independently which turns off the subject LED color. Each processor monitors the operation of the other and of the serial connection between them. Any failure detected by either processor will result in an open memory connection. When the memory connection is open, the lamp is inherently in a safe condition.

As described above, the LED signal lamp is adaptable to work with wayside control relays. There are other significant variations in the operation of wayside control systems that it is desirable to allow the lamp to be readily adaptable, so as to increase the flexibility with which it can be employed in connection with different control systems. For example, the test pulses can vary significantly in power levels—and the circuit board for the light out circuit can incorporate mounting locations for resistors to handle the higher energy level pulses.

To provide for lamp operation when the normal power supply is unavailable, many signal lamps are provided with battery backups. Incandescent lamps can continue to operate until battery voltage is effectively depleted, but this can pose a problem for LED replacement lamps—particularly in connection with the cold filament test response.

In some controllers, the cold filament test pulse is a full power pulse and is identical to the first few milliseconds of power supplied when the lamp is turned on. During the first few milliseconds, the cold filament response circuit (including the memory connection) provides a very low resistance, as described above. If power is applied for more than a few milliseconds, the processors make a determination that the lamp is on and turn off the cold filament response circuit. This is important in the case of the full power pulse, as prolonged application to the memory connection will cause it to fail open.

As mentioned above, other controllers with which the LED lamp could be used will send lower power cold filament pulses, which would not open the memory connection. However, these pulses have a longer duration which could result in an unwanted flash of the LED lamp. To avoid this, the turn on voltage of the main processor is set higher than the voltage of the lower power pulse. Since the lower power cold filament pulse will not turn the main processor on, the LED lamp will not be turned on.

However, in the case of artificially depressed low voltage lamp operation with a full power pulse-type controller, the sustained operating voltage can be too low to turn on the main processor, but high enough to cause the memory connection to fail open (this problem is mitigated where a latching relay is used instead of a fuse for the memory connection). However, the low voltage processor continues in operation, allowing the cold filament circuit to be turned off, as necessary and prevent improper opening of the cold filament circuit. The low voltage processor preferably continues to operate at least until input voltage is reduced to below 2 VDC. The memory connection will not fail open due to prolonged application of voltage below this level.

The above described embodiments are presented for illustrative and exemplary purposes; the present invention is not necessarily limited thereto. Rather, those skilled in the art will appreciate that various modifications, as well as adaptations to particular circumstances, will fall within the scope of the invention herein shown and described and of the claims appended hereto.

What is claimed is:

1. A light emitting diode (LED) signal lamp comprising:
   a lamp housing having at least one light opening;
   a first power connection mounted on the lamp housing for connection to a first power cable;
   a first plurality of LEDs mounted within the lamp housing to shine through the at least one light opening when powered; and
   a first control circuit for supplying electrical power to the first plurality of LEDs via the first power connection;
   wherein the first control circuit includes a load resistor and is configured to automatically use the load resistor to measure a first cable resistance of the first power cable and control the supply of electrical power to the first plurality of LEDs based thereon; and
   wherein the first control circuit further includes a first memory connection, the first control circuit being further configured to monitor first lamp failure criteria and to open the first memory connection upon determining satisfaction of the first lamp failure criteria, opening of the first memory connection being effective to indicate failure of first lamp operational tests transmitted via the first power cable.

2. The LED signal lamp of claim 1, wherein the first control circuit automatically dims the first plurality of LEDs when a first supply voltage drops below a first turn on threshold voltage.

3. The LED signal lamp of claim 2, wherein the first control circuit includes a first switching power supply for supplying power to the first plurality of LEDs, and dimming is accomplished by operating the first switching power supply to increase an off time of the first plurality of LEDs.

4. The LED signal lamp of claim 2, wherein the first control circuit is configured to calculate a first turn on threshold voltage based on the first cable resistance.

5. The LED signal lamp of claim 4, wherein the first control circuit is configured to calculate the first turn on threshold voltage as the sum of a first base turn on threshold voltage plus a first estimated voltage drop determined from the first cable resistance.

6. A light emitting diode (LED) signal lamp comprising:
   a lamp housing having at least one light opening;
   a first power connection mounted on the lamp housing for connection to a first power cable;
   a first plurality of LEDs mounted within the lamp housing to shine through the at least one light opening when powered; and
   a first control circuit for supplying electrical power to the first plurality of LEDs via the first power connection;
   wherein the first control circuit includes a load resistor and is configured to automatically use the load resistor to measure a first cable resistance of the first power cable and control the supply of electrical power to the first plurality of LEDs based thereon;
   wherein the first control circuit automatically dims the first plurality of LEDs when a first supply voltage drops below a first turn on threshold voltage; and
   wherein the first control circuit is configured to not supply power to the first plurality of LEDs when a first measured voltage drops below a first low voltage threshold, the first low voltage threshold being lower than the first base turn on threshold but higher than zero.

7. The LED signal lamp of claim 1, wherein the first memory connection includes at least one of a first fusible link and a first latching relay.

8. The LED signal lamp of claim 7, wherein the first memory connection includes the first latching relay and the first control circuit is not operable to reset the first latching relay after opening.

9. The LED signal lamp of claim 7, further comprising:
   a second power connection mounted on the lamp housing for connection to a second power cable;
   a second plurality of LEDs mounted within the lamp housing to shine through the at least one light opening when powered; and
   a second control circuit for supplying electrical power to the second plurality of LEDs via the second power connection;
   wherein the first plurality of LEDs are a different color than the second plurality of LEDs.

10. A light emitting diode (LED) signal lamp comprising:
    a lamp housing having at least one light opening;
    a first power connection mounted on the lamp housing for connection to a first power cable;
    a first plurality of LEDs mounted within the lamp housing to shine through the at least one light opening when powered; and
    a first control circuit for supplying electrical power to the first plurality of LEDs via the first power connection, the first control circuit including first and second processors and a first memory connection;
    wherein the first and second processors are configured to independently monitor first lamp failure criteria and independently open the first memory connection upon determining satisfaction of the first lamp failure criteria, opening of the first memory connection being effective to indicate failure of first lamp operational tests transmitted via the first power cable.

11. The LED signal lamp of claim 10, wherein the first lamp failure criteria are satisfied by failure of either of the first and second processors.

12. The LED signal lamp of claim 10, wherein the first lamp failure criteria are satisfied by failure of a data connection between the first and second processors.

13. The LED signal lamp of claim 10, wherein the first lamp failure criteria are satisfied by a LED failure determination of a predetermined number of the first LEDs.

14. The LED signal lamp of claim 13, wherein the LED failure determination is based on sensing a current draw of the first plurality of LEDs falling below a first predetermined current threshold stored in non-volatile memory of the first control circuit.

15. The LED signal lamp of claim 14, wherein the first predetermined current threshold stored in non-volatile memory is based on actual measured current draw of the first plurality of LEDs when newly-installed.

16. The LED signal lamp of claim 14, wherein the first control circuit is configured to store a failure counter in non-volatile memory recording how often the current draw of the first plurality of LEDs has been sensed falling below the first predetermined current threshold, the LED failure determination only be made after the failure counter reaches a first predetermined counter threshold.

17. The LED signal lamp of claim 16, wherein the failure counter stores a cumulative time that the current draw of the first plurality of LEDs has been sensed falling below the first predetermined current threshold.

18. The LED signal lamp of claim 13, wherein the first control circuit is configured to generate an imminent failure indication based on an imminent failure threshold before the LED failure determination is reached.

19. The LED signal lamp of claim 10, wherein the second processor continues operating at a lower voltage than the first processor.

20. The LED signal lamp of claim 10, wherein the first control circuit is configured to store in non-volatile memory a particular one of the first lamp failure criteria that resulted in opening of the first memory connection.

21. The LED signal lamp of claim 10, wherein the first memory connection includes at least one of a first fusible link and a first latching relay.

22. The LED signal lamp of claim 21, wherein the first memory connection includes the first latching relay and the first control circuit is not operable to reset the first latching relay after opening.

23. The LED signal lamp of claim 10, further comprising:
a second power connection mounted on the lamp housing for connection to a second power cable;
a second plurality of LEDs mounted within the lamp housing to shine through the at least one light opening when powered; and
a second control circuit for supplying electrical power to the second plurality of LEDs via the second power connection;
wherein the first plurality of LEDs are a different color than the second plurality of LEDs.

24. A light emitting diode (LED) signal lamp comprising:
a lamp housing having at least one light opening;
a first power connection mounted on the lamp housing for connection to first and second power lines;
a first plurality of LEDs mounted within the lamp housing to shine through the at least one light opening when powered; and
a first control circuit for supplying electrical power to the first plurality of LEDs via the first power connection, the first control circuit including a first memory connection;
wherein the first control circuit is configured to independently monitor first lamp failure criteria and open the first memory connection upon determining satisfaction of the first lamp failure criteria, opening of the first memory connection being effective to indicate failure of first lamp operational tests transmitted via the primary power line, the first control circuit powering the first plurality of LEDs from the first power line prior to opening the first memory connection and from the second power line subsequent to opening the first memory connection.

25. The LED signal lamp of claim 24, wherein the first memory connection includes a latching relay and opening of the first memory connection disconnects the first plurality of LEDs from the first power line and connects the first plurality of LEDs to the second power line.

26. The LED signal lamp of claim 25, wherein the first control circuit is not operable to reset the first latching relay after opening.

27. The LED signal lamp of claim 24, wherein the first lamp failure criteria are satisfied by a LED failure determination of a predetermined number of the first LEDs.

28. The LED signal lamp of claim 27, wherein the LED failure determination is based on sensing a current draw of the first plurality of LEDs falling below a first predetermined current threshold stored in non-volatile memory of the first control circuit.

29. The LED signal lamp of claim 23, further comprising:
a second power connection mounted on the lamp housing for connection to a second set of primary and secondary power lines;
a second plurality of LEDs mounted within the lamp housing to shine through the at least one light opening when powered; and
a second control circuit for supplying electrical power to the second plurality of LEDs via the second power connection;
wherein the first plurality of LEDs are a different color than the second plurality of LEDs.

* * * * *